United States Patent [19]
Baldwin

[11] 3,903,740
[45] Sept. 9, 1975

[54] WIND TUNNEL DIFFERENTIAL FLOW FLAPS

[75] Inventor: Richard J. Baldwin, Sparta, N.J.

[73] Assignee: The United States of America as represented by the Secretary of the Army, Washington, D.C.

[22] Filed: Apr. 10, 1974

[21] Appl. No.: 459,764

[52] U.S. Cl.................................. 73/147; 60/39.23
[51] Int. Cl.². ........................................ G01M 9/00
[58] Field of Search ........... 73/147; 60/39.23, 39.29

[56] References Cited
UNITED STATES PATENTS

| | | | |
|---|---|---|---|
| 2,560,634 | 7/1951 | Colley | 73/147 X |
| 2,580,228 | 12/1951 | Johnson | 73/147 |
| 2,850,873 | 9/1958 | Hausmann | 73/147 X |
| 2,968,944 | 1/1961 | Manoni | 73/147 |
| 2,989,846 | 6/1961 | Hausammann | 73/147 X |
| 3,027,760 | 4/1962 | Holderer | 73/147 |

Primary Examiner—Richard C. Queisser
Assistant Examiner—Daniel M. Yasich
Attorney, Agent, or Firm—Nathan Edelberg; Robert P. Gibson; Max Yarmovsky

[57] ABSTRACT

A group of pivotally held flaps are positioned against the outside perforated wall surface of a wind tunnel to control the pressure distribution therein. The flaps are pivoted at their upstream edge and butt against each other at their downstream edge. The flaps allow air to escape the perforated section of the wind tunnel in the upstream end where the reflected bow shock wave impinges on the perforated wall. Further downstream where compression shock waves occur the flaps are closed down to prevent inflow or compression waves from impinging on the model causing uneven pressure distribution.

1 Claim, 3 Drawing Figures

WIND TUNNEL DIFFERENTIAL FLOW FLAPS

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art to improve the uniformity of pressure distribution in a transonic wind tunnel. The pressure distribution and Mach number are adversely affected in uncompensated wind tunnels because of the interference effects on the model suspended and tested therein caused by expansion and contraction waves which are generated. Prior art transonic wind tunnels have made an attempt to overcome these unequal pressure distributions by using variable porosity sliding walls. These variable porosity walls can adjust the overall porosity of the test section to a limited fixed range. However, these prior art wind tunnels do not have the differential capabilities to change the porosity longitudinally throughout the test section. Where for instance sliding walls have been made to handle a 20° cone-cylinder model, that same wall arrangement would not give optimum pressure distribution for a blunt nose missile with a boat-tail. The present invention overcomes many of the aforementioned problems by its unique design.

SUMMARY OF THE INVENTION

The present invention relates to differential flow flaps for a transonic wind tunnel test section. A plurality of pivoted flaps are positioned in close proximity to the backside of the inner porous wall of the wind tunnel and lie between the wind tunnel support structure and the inner tunnel wall. The flaps are fastened in one embodiment in a pre-determined pattern to compensate for the expansion wave by allowing outflow air to be suctioned out of the plenum more effectively, and for compensating for the compressive wave by preventing inflow of air from outside the plenum from impinging on the model. In another alternate embodiment instead of fastening the flaps in a pre-determined pattern, the flaps are suspended by light leaf springs which allow the impinging shock waves to open the flaps for outflow air, and to close to hold back the inflowing air.

An object of the present invention is to provide a differential flow flap to control the pressure distribution in a transonic wind tunnel.

Another object of the present invention is to provide a differential flow flap which, in the case of an expansion wave, will permit outflow air to be suctioned out of the plenum of a transonic wind tunnel.

Another object of the present invention is to provide a differential flow flap which, in the case of compression wave, prevents the inflow air from impinging on the test piece.

Another object of the present invention is to provide a differential flow flap for a transonic wind tunnel which will reduce the interference effects on a test piece caused by expansion and compression waves generated in the tunnel.

A further object of the present invention is to provide a differential flow flap for a transonic wind tunnel that economically controls the inflow and outflow of air through the porous walls of the tunnel test section.

For the better understanding of the present invention, together with other and further objects thereof, reference is made to the following description taken in connection with the accompanying drawings.

DESCRIPTION OF THE PREFERRED EMBODIMENTS

Figure 1:
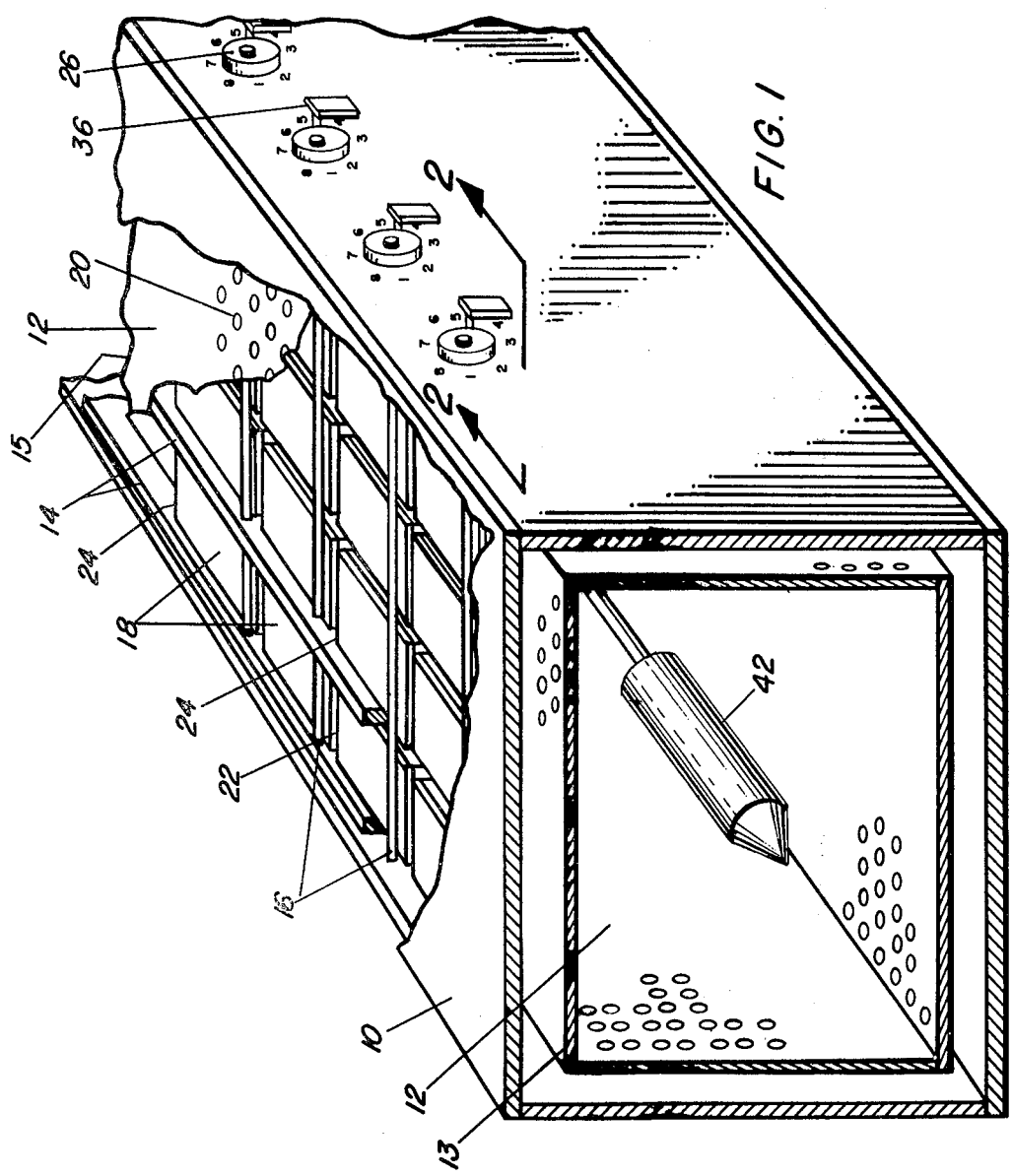
FIG. 1 shows an isometric partial cut-away view of the transonic wind tunnel test section.

Referring now to FIG. 1 the wind tunnel test section has a tubular shaped tunnel housing 10, an inner, tubular shaped, perforated member 12 which is spaced therefrom by support structure 14. The perforated member 12 has an upstream end 13 and a downstream end 15. A plurality of transversely supported pivot rods 16 hingedly support a plurality of valve means that include differential flow flaps 18 so that the latter will cover perforations 20 on the backside of wall member 12. Each set of flaps 18 are pivoted at the upstream flap ends 22; the downstream flap edges 24 of each set of flaps 18 are adjacent to the pivoted upstream flap ends 22. The arrangement shown in FIG. 1 shows only one group of flaps 18, however, additional groups of flaps (not shown) are incorporated on all four sides of the test section.

Figure 2:
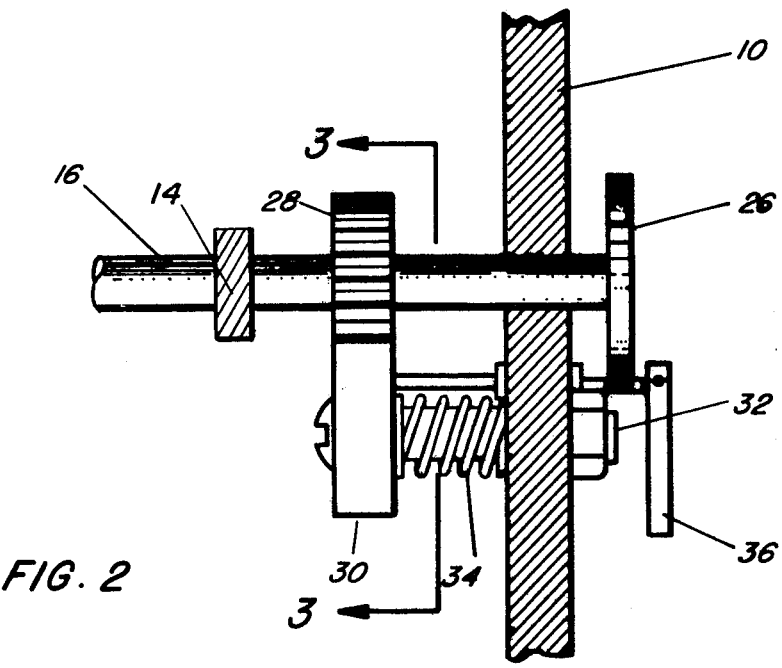
FIG. 2 shows a partial cross-sectional view of the test section taken along line 2—2 of FIG. 1.
Figure 3:
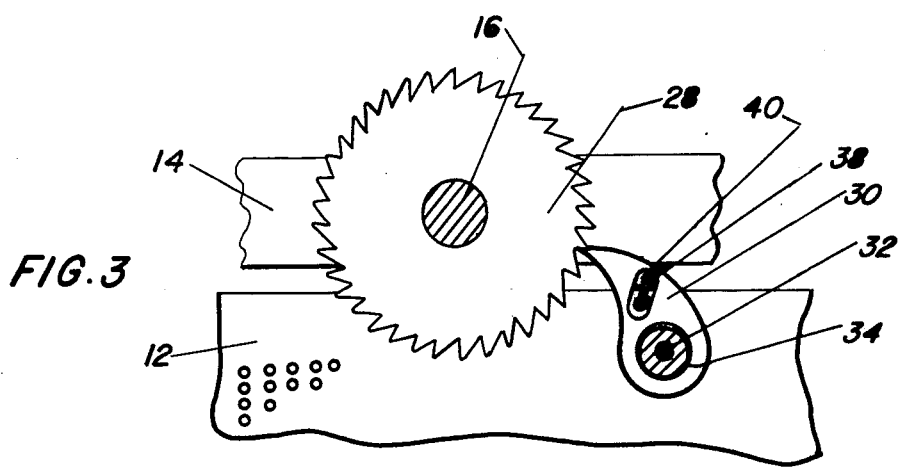
FIG. 3 shows a side view of the test section taken along line 3—3 of FIG. 2.

Referring now to FIGS. 1, 2 and 3, the pivot rod 16 passes through the housing 10 and the support structure 14. A ratchet 28 is mounted on rod 16 intermediate housing 10 and perforated member 12. A pawl 30 is biasedly positioned against ratchet 28 by spring 34 and pawl support bolt 32. Release lever 36 is rotated in a clockwise direction so that pin 38, positioned in slot 40, will cam the pawl 30 away from ratchet 28 when one desires to reset flaps 18. The differential flaps 18 are accurately positioned by control knob 26 to a given opening or completely closed when it is necessary to adjust for a given shock wave pattern. The flaps 18 at the upstream end of the test section, where a reflected bow shock wave from test piece 42 impinges on the perforated wall 12, can be opened an appropriate amount to allow outflow of the air. Further downstream, where the compression shock waves occur causing inflow, the flaps 18 can be closed entirely or opened just slightly thereby preventing the inflow or compression waves from impinging on the model and causing uneven pressure distribution thereon.

An alternate embodiment (not shown) for self-adjustment of the flaps would be to have the flaps 18 suspended by very light leaf springs which allow the impinging shock waves to open the flaps 18 for outflow air and to close the flaps 18 to entrap inflowing air.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described this invention, what is claimed as new and desired to be secured by Letters Patent of the United States is:

1. A transonic wind tunnel test section which comprises:
   a tubular housing;
   a tubularly shaped perforated member positioned within and supported sparedly from said housing; and
   valve means, located between said housing and said perforated member, for selectively regulating the amount of air that flows into and out of said perforated member, said valve means creating substantially uniform pressure distribution across a test piece supported within said perforated member, said valve means includes:
      a plurality of flaps positioned intermediate said housing and said perforated member for selectively covering said perforated member to control the flow of air therethrough;
      a plurality of pivot rods positioned transversely across said test section and supported between said housing and said perforated member for rotatably supporting said flaps; and
   flap adjusting means for positioning the degree of opening of said flaps which further includes;
      a ratchet mounted near a first end of each of said pivot rods and located intermediate said housing and said perforated member;
      a biased pawl supported by said housing which engages said ratchet and holds said ratchet in a fixed set position;
      a knob mounted on said first end of said rod for rotating and locating the relative degree of opening of said flaps; and
      lever means for releasing said pawl so that said flaps can be reset.

* * * * *